United States Patent
Bhatia et al.

(10) Patent No.: US 8,259,706 B2
(45) Date of Patent: *Sep. 4, 2012

(54) MULTISTAGE PRIORITIZATION OF PACKETS WITHIN A SESSION OVER INTERNET PROTOCOL (SOIP) NETWORK

(75) Inventors: Medhavi Bhatia, Germantown, MD (US); Sridhar Ramachandran, Rockville, MD (US); David E. Sturtevant, Reston, VA (US); Paritosh Tyagi, Germantown, MD (US)

(73) Assignee: Genband US LLC, Plano, TX (US)

( * ) Notice: Subject to any disclaimer, the term of this patent is extended or adjusted under 35 U.S.C. 154(b) by 1057 days.

This patent is subject to a terminal disclaimer.

(21) Appl. No.: 11/537,329

(22) Filed: Sep. 29, 2006

(65) Prior Publication Data

US 2007/0201481 A1    Aug. 30, 2007

Related U.S. Application Data

(60) Provisional application No. 60/777,242, filed on Feb. 28, 2006.

(51) Int. Cl.
*H04L 12/66* (2006.01)
*H04L 12/28* (2006.01)

(52) U.S. Cl. .... 370/352; 370/389; 370/392; 370/395.42

(58) Field of Classification Search .................. None
See application file for complete search history.

(56) References Cited

U.S. PATENT DOCUMENTS

| | | | |
|---|---|---|---|
| 5,796,424 A | 8/1998 | Ely et al. | |
| 6,738,813 B1 | 5/2004 | Reichman | |
| 6,775,269 B1 | 8/2004 | Kaczmarczyk et al. | |
| 6,775,280 B1 | 8/2004 | Ma et al. | |
| 6,904,017 B1 | 6/2005 | Meempat et al. | |
| 6,944,678 B2 | 9/2005 | Lu et al. | |
| 6,980,526 B2 | 12/2005 | Jang et al. | |
| 7,002,973 B2 | 2/2006 | MeLampy et al. | |
| 7,028,092 B2 | 4/2006 | MeLampy et al. | |
| 7,031,311 B2 | 4/2006 | MeLampy et al. | |

(Continued)

FOREIGN PATENT DOCUMENTS

JP    2004193845 A    7/2004

(Continued)

OTHER PUBLICATIONS

Yenra: VOIP: Session Border Controller [online], dated Oct. 18, 2004, [retrieved on Dec. 20, 2004]. Retrieved from the Internet: <URL: http://www.yenra.com/session-border-controller/> (2 pages).

(Continued)

*Primary Examiner* — Brandon Renner
(74) *Attorney, Agent, or Firm* — Jenkins, Wilson, Taylor & Hunt, P.A.

(57) ABSTRACT

A method includes receiving, at a first endpoint, session data associated with a first Internet Protocol (IP) packet. The IP packet is associated with a session within a Session over Internet Protocol (SoIP) network and the session is associated with a call. An instruction, based on the session data, is sent from the first endpoint to a second endpoint. The instruction is configured to trigger the second endpoint to modify a priority indicator associated with at least one of the first IP packet or a second IP packet associated with the call.

26 Claims, 10 Drawing Sheets

U.S. PATENT DOCUMENTS

| | | | |
|---|---|---|---|
| 7,072,303 B2 | 7/2006 | MeLampy et al. | |
| 7,133,923 B2 | 11/2006 | MeLampy et al. | |
| 7,142,532 B2 | 11/2006 | Penfield et al. | |
| 7,151,781 B2 | 12/2006 | MeLampy et al. | |
| 7,193,996 B2 | 3/2007 | Dobbins et al. | |
| 7,260,085 B2 | 8/2007 | Dobbins et al. | |
| 7,362,707 B2 | 4/2008 | MeLampy et al. | |
| 7,376,731 B2 | 5/2008 | Khan et al. | |
| 7,433,315 B2 | 10/2008 | Bhatia et al. | |
| 7,447,160 B1 | 11/2008 | Croak et al. | |
| 7,483,380 B2 | 1/2009 | Metke | |
| 7,697,682 B2 | 4/2010 | Tsuruga | |
| 7,860,990 B2 | 12/2010 | Mallesan et al. | |
| 7,861,003 B2 | 12/2010 | Mallesan | |
| 7,865,612 B2 | 1/2011 | Mallesan et al. | |
| 7,881,199 B2 | 2/2011 | Krstulich | |
| 7,912,062 B2 | 3/2011 | Gulati et al. | |
| 2001/0033551 A1 | 10/2001 | Busuioc et al. | |
| 2003/0005152 A1 | 1/2003 | Diwan et al. | |
| 2003/0072271 A1* | 4/2003 | Simmons et al. | 370/255 |
| 2003/0137989 A1* | 7/2003 | Nagai | 370/455 |
| 2003/0161310 A1* | 8/2003 | Dobbins et al. | 370/392 |
| 2004/0015583 A1 | 1/2004 | Barrett et al. | |
| 2004/0025186 A1 | 2/2004 | Jennings et al. | |
| 2004/0086093 A1 | 5/2004 | Schranz | |
| 2004/0117624 A1 | 6/2004 | Brandt et al. | |
| 2004/0128201 A1 | 7/2004 | Ofir et al. | |
| 2004/0250114 A1 | 12/2004 | Parekh et al. | |
| 2005/0111382 A1 | 5/2005 | Le et al. | |
| 2005/0147031 A1 | 7/2005 | Bhatia et al. | |
| 2005/0213591 A1* | 9/2005 | Nakazawa et al. | 370/401 |
| 2005/0265231 A1 | 12/2005 | Gunther et al. | |
| 2006/0098577 A1 | 5/2006 | MeLampy et al. | |
| 2006/0126664 A1 | 6/2006 | Horton | |
| 2006/0187927 A1 | 8/2006 | MeLampy et al. | |
| 2006/0187942 A1* | 8/2006 | Mizutani et al. | 370/401 |
| 2006/0190553 A1* | 8/2006 | Kojima | 709/216 |
| 2006/0215683 A1 | 9/2006 | Sukkar et al. | |
| 2006/0245574 A1 | 11/2006 | Phelps et al. | |
| 2007/0019619 A1* | 1/2007 | Foster et al. | 370/352 |
| 2007/0036151 A1 | 2/2007 | Baeder | |
| 2007/0058639 A1 | 3/2007 | Khan | |
| 2007/0076591 A1 | 4/2007 | Khan | |
| 2007/0076594 A1 | 4/2007 | Khan et al. | |
| 2007/0076603 A1 | 4/2007 | MeLampy et al. | |
| 2007/0076710 A1 | 4/2007 | Khan | |
| 2007/0076855 A1 | 4/2007 | MeLampy et al. | |
| 2007/0104105 A1 | 5/2007 | MeLampy et al. | |
| 2007/0116043 A1 | 5/2007 | MeLampy et al. | |
| 2007/0180080 A1 | 8/2007 | Mallesan et al. | |
| 2007/0180124 A1 | 8/2007 | Mallesan et al. | |
| 2007/0180141 A1 | 8/2007 | Mallesan | |
| 2007/0201473 A1 | 8/2007 | Bhatia et al. | |
| 2009/0086728 A1 | 4/2009 | Gulati et al. | |

FOREIGN PATENT DOCUMENTS

| | | |
|---|---|---|
| WO | WO 02/49279 A2 | 6/2002 |
| WO | WO 02/49315 A2 | 6/2002 |
| WO | WO 02/49316 A2 | 6/2002 |
| WO | WO 02/58349 | 7/2002 |

OTHER PUBLICATIONS

Stephen Hayes, "IP Based Multimedia Services Platform," Ericsson, ITU-T IMT-2000 and Beyond—May 28, 2002, Ottawa, CN (19 pages).

Acme Packet, Inc., "Session Admission Control: Interactive Communication SLAs over Skinny Pipes" (2002) (14 pages).

Official Action for U.S. Appl. No. 11/537,345 (Mar. 4, 2009).

Official Action for U.S. Appl. No. 11/537,316 (Feb. 20, 2009).

Supplemental Notice of Allowability for U.S. Appl. No. 11/343,218 (Dec. 1, 2010).

Supplemental Notice of Allowability for U.S. Appl. No. 11/343,212 (Dec. 1, 2010).

Notice of Allowance and Fee(s) Due for U.S. Appl. No. 11/343,218 (Sep. 8, 2010).

Notice of Allowance and Fee(s) Due for U.S. Appl. No. 11/343,212 (Sep. 7, 2010).

Interview Summary for U.S. Appl. No. 11/343,212 (Aug. 3, 2010).

Official Action for U.S. Appl. No. 11/343,212 (Apr. 28, 2010).

Official Action for U.S. Appl. No. 11/537,345 (Nov. 3, 2009).

Official Action for U.S. Appl. No. 11/537,316 (Sep. 25, 2009).

Interview Summary for U.S. Appl. No. 11/537,345 (Feb. 5, 2010).

Interview Summary for U.S. Appl. No. 11/343,212 (Jan. 26, 2010).

Final Official Action for U.S. Appl. No. 11/343,212 (Dec. 18, 2009).

Final Official Action for U.S. Appl. No. 11/343,218 (Nov. 13, 2009).

Interview Summary for U.S. Appl. No. 11/343,212 (Oct. 1, 2009).

Interview Summary for U.S. Appl. No. 11/343,218 (Jul. 22, 2009).

Official Action for U.S. Appl. No. 11/343,218 (Mar. 18, 2009).

Official Action for U.S. Appl. No. 11/343,212 (Mar. 13, 2009).

Smiljanić, "Flexible Bandwidth Allocation in High-Capacity Packet Switches," IEEE/ACM Transactions on Networking, vol. 10, No. 2, pp. 287-293 (Apr. 2002).

Non-Final Official Action for U.S. Appl. No. 11/537,316 (Jan. 6, 2012).

Notice of Allowance and Fee(s) Due for U.S. Appl. No. 11/537,345 (Dec. 12, 2011).

* cited by examiner

| Transmission Priority | Session Layer Parameter | Extrinsic Parameter | Device Attribute | Type of Threshold |
|---|---|---|---|---|
| High | Jitter > 2 ms | | | IP packet |
| High | | Day = Tuesday | | Session |
| Low | | | Video phone | Device |
| Medium | Delay > 10 ms | Time < 10:00 AM | | IP packet group |

MULTISTAGE PRIORITIZATION OF PACKETS WITHIN A SESSION OVER INTERNET PROTOCOL (SOIP) NETWORK

RELATED APPLICATIONS

The present application claims priority to the commonly owned U.S. Provisional Patent Application No. 60/777,242, entitled "User-Selectable Prioritization of Calls within a Session Over Internet Protocol (SOIP) Network," filed on Feb. 28, 2006, which is incorporated herein by reference in its entirety. This application is related to the following commonly owned and assigned applications: application Ser. No. 11/537,316, "Prioritization within a Session Over Internet Protocol (SOIP) Network," filed on Sep. 29, 2006; and application Ser. No. 11/537,345, "Quality of Service Prioritization of Internet Protocol Packets Using Session-Aware Components," filed on Sep. 29, 2006; each of which is incorporated herein by reference in its entirety.

FIELD OF INVENTION

The present invention relates to Session over Internet Protocol (SoIP) networks, and in particular, but not by way of limitation, the present invention relates to systems and methods for multistage prioritization of a call within a SoIP network.

BACKGROUND

Voice telecommunications have historically been conducted via dedicated telephone networks using telephone switching offices and either wired or wireless connections for transmitting the voice signals between users' telephones. Such telecommunications, which can use the public switched telephone network (PSTN), can be referred to as circuit-committed communications. Because of the circuit based nature of the PSTN, modifying a connection or route can be a relatively slow process that often involves manual intervention.

Session over Internet Protocol (SoIP), also referred to as Media over Internet Protocol (MoIP), provides an alternative communication system that uses discrete Internet Protocol (IP) packets of digitized information to transmit media-content such as voice content, video content and/or data, over the internet or within an intranet via wired and/or wireless connections. SoIP technology includes Voice over Internet Protocol (VoIP) technology, which is used primarily to transmit voice signals over an IP network. Because SoIP technology is based on IP packet switching, SoIP calls or sessions and routes/connections for IP packets can be defined and managed quickly using session-aware equipment or components. Known session-aware equipment or components, however, do not provide the prioritization of IP packets that is possible with SoIP technology. Thus, a need exists for a method and apparatus for session-aware modification of the priority of SoIP IP packets.

SUMMARY OF THE INVENTION

In one embodiment, a method includes receiving, at a first endpoint, session data associated with a first Internet Protocol (IP) packet. The IP packet is associated with a session within a Session over Internet Protocol (SoIP) network and the session is associated with a call. An instruction, based on the session data, is sent from the first endpoint to a second endpoint. The instruction is configured to trigger the second endpoint to modify a priority indicator associated with at least one of the first IP packet or a second IP packet associated with the call.

BRIEF DESCRIPTION OF THE DRAWINGS

FIG. 3 is a table that illustrates a priority database with transmission priorities and corresponding threshold conditions, according to an embodiment of the invention.

DETAILED DESCRIPTION

Session over Internet Protocol (SoIP) technology, also referred to as Media over Internet Protocol (MoIP), uses discrete Internet Protocol (IP) packets of digitized information to transmit media-content such as voice content, video content and/or data, over the internet or within an intranet via wired and/or wireless connections. IP packets are transmitted between endpoints over calls that include one or more sessions and/or connections/routes that are defined, monitored, and controlled, at least in part, by session aware equipment or components such as a session controller (SC). Session-aware equipment or components—equipment or components that operate on layer 5 of the OSI model—manage the dialogue between endpoints, for example, by creating and terminating sessions and/or calls between endpoints. Session-aware equipment or components can use data and/or information associated with layer 3 of the OSI model.

Session aware equipment and/or components can change, or send a signal to change, a priority indicator associated with an individual IP packet or a priority indicator uniquely associated with each IP packet from a group of IP packets. A priority indicator indicates the priority of an IP packet when transmitted through one or more nodes within a SoIP network. The priority indicator can be changed based on any combination of session data with reference to thresholds and corresponding transmission priority values stored in a priority database. Session data is data related to layer 3 and/or layer 5 of the OSI model and includes value(s) for session layer parameters and/or includes value(s) for extrinsic parameters.

The session data used for modifying a priority indicator can be associated with one or more IP packets or can be associated with any combination of calls, endpoints, connections, portions of calls, and/or routes used in transmitting one or more IP packets. For example, a priority indicator associated with an IP packet can be modified based on the type of content in the IP packet or based on a measurement associated with a session that is used in transmitting the IP packet. The process of monitoring session data and dynamically modifying the transmission priority values of IP packets within the SoIP network can be referred to as prioritization.

Figure 1:
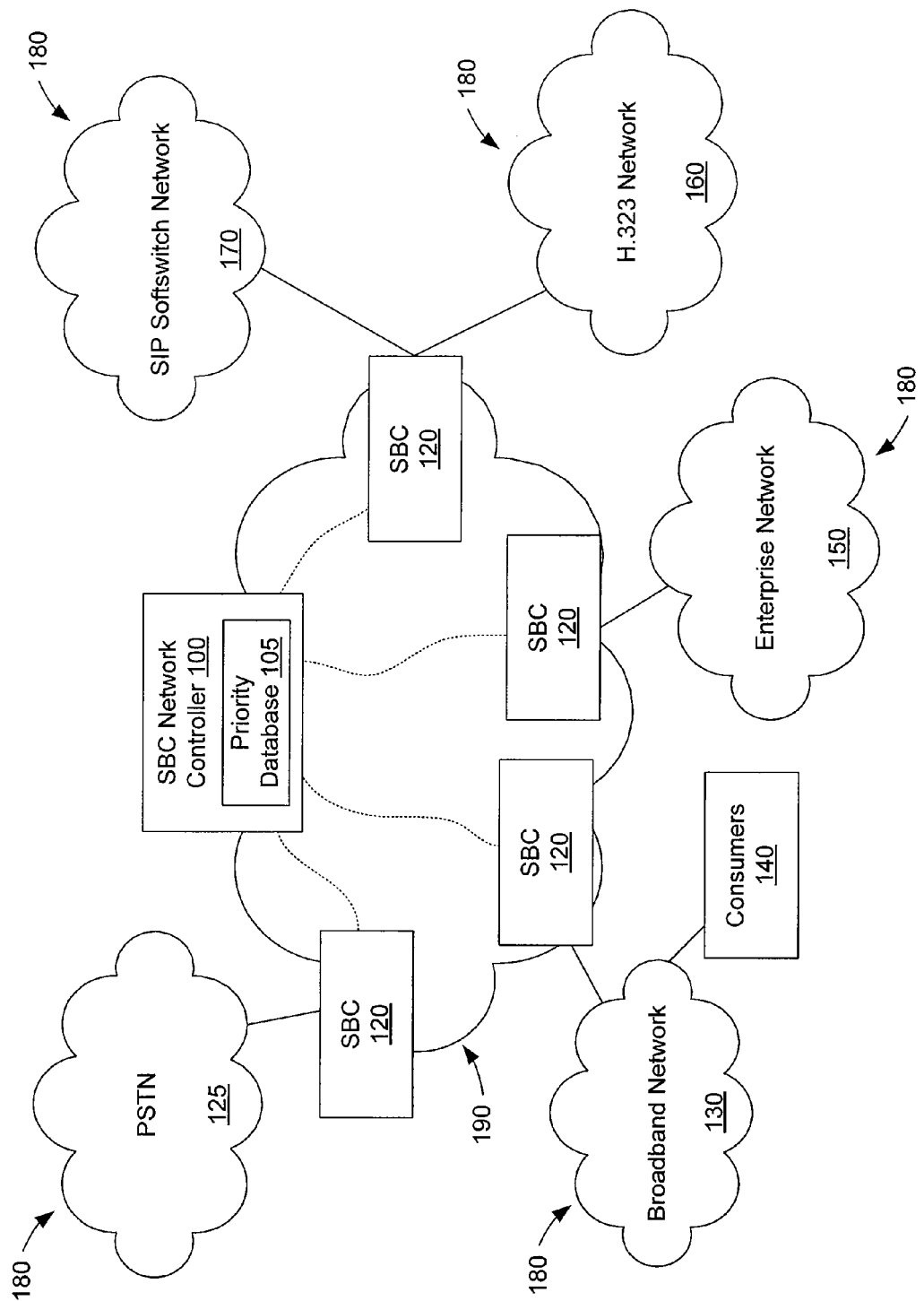
FIG. 1 shows a system block diagram of a Session over Internet Protocol (SoIP) network, according to an embodiment of the invention.

Referring now to the drawings, FIG. 1 is a block diagram of a SoIP network 190, according to an embodiment of the invention. The figure shows a session-border-controller network controller (SBC-network controller) 100 connected to multiple session border controllers (SBCs) 120. The SBC-network controller 100 is a centralized management component that controls, configures, and/or coordinates the SoIP network 190. The SBC-network controller 100 includes a priority database 105 that SBCs 120 can use/access when modifying the transmission priority values of IP packets transmitted within the SoIP network 190. The SBC-network controller 100 can include a user interface (not shown) for configuring one or more SBCs 120 that are connected to the SBC-network controller 100 and/or for modifying information stored in the priority database 105. Because not all SCs in SoIP network 190 may be at the borders of the network, SBC-network controller 100 may, in such contexts, be termed a session-controller-network controller (SC-network controller) and can be associated with session controllers.

Each of the SBCs 120 establish, control, and/or monitor, at least in part, sessions and/or calls between one or more endpoints 180 and have access to the priority database 105. In this illustrative embodiment, the endpoints 180 include but are not limited to a public switched telephone network (PSTN) 125, a broadband network 130 that can provide network access to broadband consumers 140, an enterprise network 150, an H.323 network 160, a session initiation protocol (SIP) softswitch network 170, or a SIP network (not shown). An endpoint 180 can also be an individual phone/computer terminal (not shown) or an access point (e.g., another SBC) to another SoIP network (not shown). Each of the endpoints 180 is an endpoint from the perspective of the individual SBC 120 that is connected to that endpoint 180.

As the SBCs 120 transmit IP packets, the SBCs 120 access threshold conditions associated with transmission priority values. The threshold conditions and associated transmission priority values are stored in the priority database 105. The SBCs 120 also collect and/or calculate session data associated with the transmitted IP packets. Based on the session data and the information accessed from the priority database 105, the SBCs 120 determine whether to modify priority indicators associated with the IP packets or subsequent IP packets.

A priority indicator indicates the priority for transmitting an IP packet within at least a portion of the SoIP network. A priority indicator can be, for example, a specific field such as a type-of-service (ToS) field in a header of an IP packet. A priority indicator can also be, for example, a Tag Control Information (TCI) parameter associated with, for example, an IEEE 802.1q standard Virtual Local Area Network (VLAN) header. The transmission priority is a more general description of the priority for transmitting a packet (e.g., high, medium, and low priority indicators) that is included in, for example, the priority database 105. A value of the transmission priority can be translated into the priority indicator or, in some embodiments, the transmission priority value stored in the priority database can be, for example, the actual binary value that is used in a ToS portion of a header of an IP packet.

If an SBC 120 determines, based on session data, that a threshold condition has been satisfied, the SBC 120 can change a priority indicator associated with an IP packet. The priority indicator will be changed based on the transmission priority value that corresponds with the satisfied threshold condition (as contained in, for example, a database). A threshold condition can be, for example, a maximum delay associated with a session and/or a call. If the maximum delay, for example, of the session and/or call is exceeded, each of the IP packets transmitted over the session and/or call can be assigned a different priority indicator based on a changed transmission priority value. In some embodiments, a threshold condition can be based on a combination of session data from session layer parameters (from layer 3 and/or layer 5) and/or extrinsic parameters.

The SBCs 120 access session data that is collected and/or stored either locally at that SBC 120 or centrally at the SBC-network controller 100. Session data includes, but is not limited to, values for session layer parameters and/or values for extrinsic parameters. The session layer parameter values include one or more of, for example, a call duration parameter value, start and end time parameter values, and source and destination endpoint parameter values and/or quality-of-service (QoS) parameter value such as a delay parameter value, a media type parameter value, a media quality parameter value, a packet loss parameter value, a packet delay variance (jitter) parameter value, and an r-factor parameter value. Extrinsic parameters include one or more of, for example, variables such as a time-of-day parameter value, a day-of-the-week parameter value, a number-of-calls parameter value, an attribute associated with a transmitting device such as an endpoint or session controller, or route cost parameters. An attribute associated with a transmitting device can be, for example, a description of the endpoint type (e.g., IP phone, video conferencing device, gateway).

Session layer parameters that are collected at and/or calculated based on data associated with layer 3 of the OSI model can be referred to as layer-3 session-layer parameters. Layer-3 session-layer parameters include, for example, QoS parameters. Session layer parameters that are collected at and/or calculated based on data associated with layer 5 of the OSI model can be referred to as layer-5 session-layer parameters. Layer-5 session-layer parameters include, for, example, a call duration parameter. A layer-5 session-layer parameter can be calculated based on data collected during, for example, a session and/or a call.

The session data (data related to any session layer parameter and/or extrinsic parameter) can be associated with one or more IP packets or with any combination of calls, endpoints, sessions, portions of connections, portions of calls, and/or routes used for transmission of IP packets. A session layer parameter value such as a jitter value, for example, can be associated with an individual IP packet, a group of IP packets, session, call or even a connection. If the jitter value corresponds to a session and/or call or a group of IP packets, the jitter value can be, for example, an average of several individual jitter measurements of selected IP packets transmitted over the session and/or call or the maximum value of an individual jitter measurement from within the group of IP packets.

Although the SBC-network controller 100 is centralized in the illustrative embodiment of FIG. 1, its functionality can, in other embodiments, be distributed throughout SoIP network 190 on any number of SCs that are on the borders or reside in the interior of the SoIP network 190. For example, some or all of the information stored in the priority database 105 can be stored locally on each SBC 120 in the SoIP network 190. If stored locally, each SBC 120 can be configured to store only the information from the priority database 105 that is relevant to the particular SBC 120. Also, the SBCs 120 can be configured to operate with a range of autonomy from an entirely autonomous mode independent from the SBC-network controller 100 to an entirely dependent mode where the SBCs 120 are controlled by the SBC-network controller 100.

Figure 2:
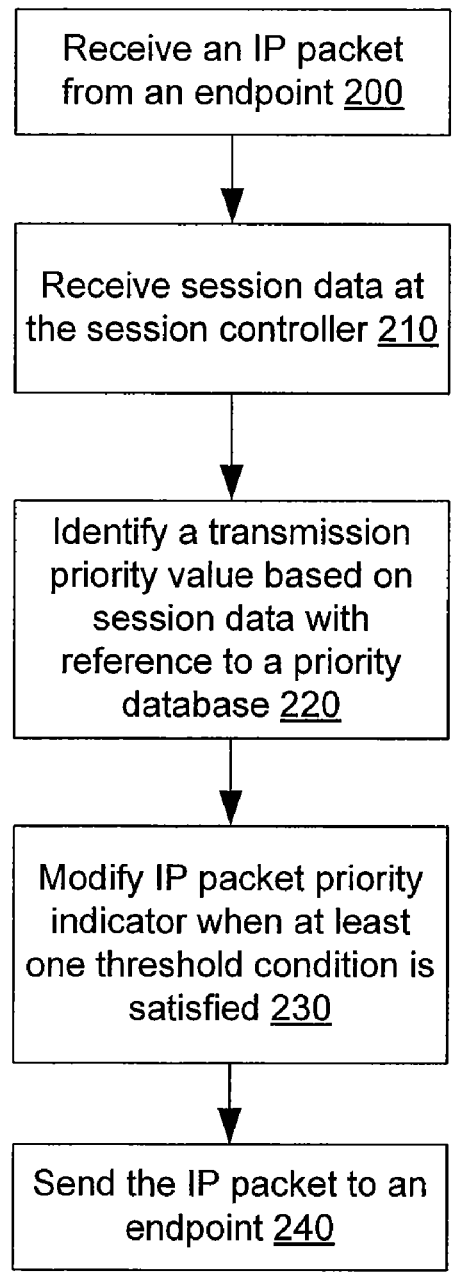
FIG. 2 is a flowchart for changing a priority indicator associated with an Internet Protocol (IP) packet transmitted over a SoIP network, according to an embodiment of the invention.

FIG. 2 is a flowchart that can be implemented by a session controller for changing a priority indicator associated with an IP packet when transmitted over at least a portion of a SoIP network. The session controller changes the priority indicator based on session data and with reference to a priority database. Although this flowchart makes reference to a session controller, the flowchart can be implemented by any type of session-aware equipment and/or component. The session data can be data related to any session layer parameter and/or extrinsic parameter.

As shown in the flowchart of FIG. 2, an IP packet is first received from an endpoint at a session controller at 200. The IP packet can be received from any type of endpoint including a terminal adapter such as, for example, an IP phone. After the IP packet is received at 200, session data associated with the IP packet is received at the session controller at 210. The session data can be directly associated with the IP packet or with any combination of calls, endpoints, sessions, portions of calls, portions of connections, and/or routes used when transmitting the IP packet.

Session data is then used by the session controller, with reference to a priority database, to identify a transmission priority value at 220. The priority database can be a local database that stores threshold conditions corresponding with transmission priority values. If none of the threshold conditions stored in the priority database are satisfied, then the priority indicator of the IP packet is not modified. When at least one threshold condition is satisfied, the priority indicator associated with the IP packet is modified at 230.

Because several threshold conditions can be stored and referenced in a priority database, conflicts between the threshold conditions can arise and can be resolved. For example, a first satisfied threshold condition can correspond to a lower transmission priority value than the transmission priority value that corresponds with a second satisfied threshold condition. This kind of conflict can be resolved by rules programmed into a session controller or within the priority database to, for example, automatically give the highest transmission priority value precedent over a lower transmission priority value. In some embodiments, an average of the transmission priority values can be assigned by the session controller to the IP packet when a conflict arises.

After the priority indicator has been modified based on the satisfied threshold condition at 230, the IP packet is sent by the session controller to an endpoint at 240. The session controller can send the IP packet back to a second endpoint that has been designated as a destination endpoint or to the endpoint that originally sent the IP packet.

FIG. 3 is a table that illustrates a priority database with transmission priority values in column 310 that correspond to threshold conditions in columns 320, 330, and 340. Columns 320, 330, and 340 contain threshold conditions related to session layer parameters 320, extrinsic parameters 330, and device attributes 340, respectively. Three levels of transmission priority 310, high, medium, and low, are related to the various threshold conditions.

The table shows that a transmission priority 310 having a value of "high" can be based on either a jitter (session layer parameter 320) of more than 2 milliseconds (ms) or based on the day (extrinsic parameter 330) being Tuesday. The table also shows that IP packets are assigned a transmission priority 310 having a value of "low" when a device attribute 340, in this case a device description, is a video phone. Also, the table illustrates that a transmission priority 310 has a value of "medium" when a boolean threshold condition involving a session layer parameter 320 and an extrinsic parameter 330 is satisfied. The boolean threshold condition is satisfied when a delay (session layer parameter 320) is greater than 10 ms and the time (extrinsic parameter 330) is before 10:00 am. The threshold conditions can be based on, for example, any combination of parameters or attributes using boolean logic or mathematical relationships.

The table also includes a column entitled type of threshold 350 that indicates, as an illustrative example, whether the threshold condition(s) is related to an individual IP packet, an IP packet group, a device, or a session. Additional columns or indicators (not shown) can be included to further restrict or augment the threshold conditions, such as indicating whether certain conditions are to be based on an average of data, etc. Also, in some embodiments, in addition to transmission priority values, instructions to execute actions, such as sending an e-mail and/or generating an instruction for another device, can be linked to the threshold conditions.

In some embodiments, the transmission priority values and/or threshold conditions in the table can be associated with a virtual routing partition established at a session controller. More details regarding virtual partitions within a session controller are set forth in co-pending application Ser. No. 11/343,211, "Method and Apparatus for Partitioning Resources within a Session-Over-Internet-Protocol (SoIP) Session Controller," which is incorporated herein by reference.

Figure 4:
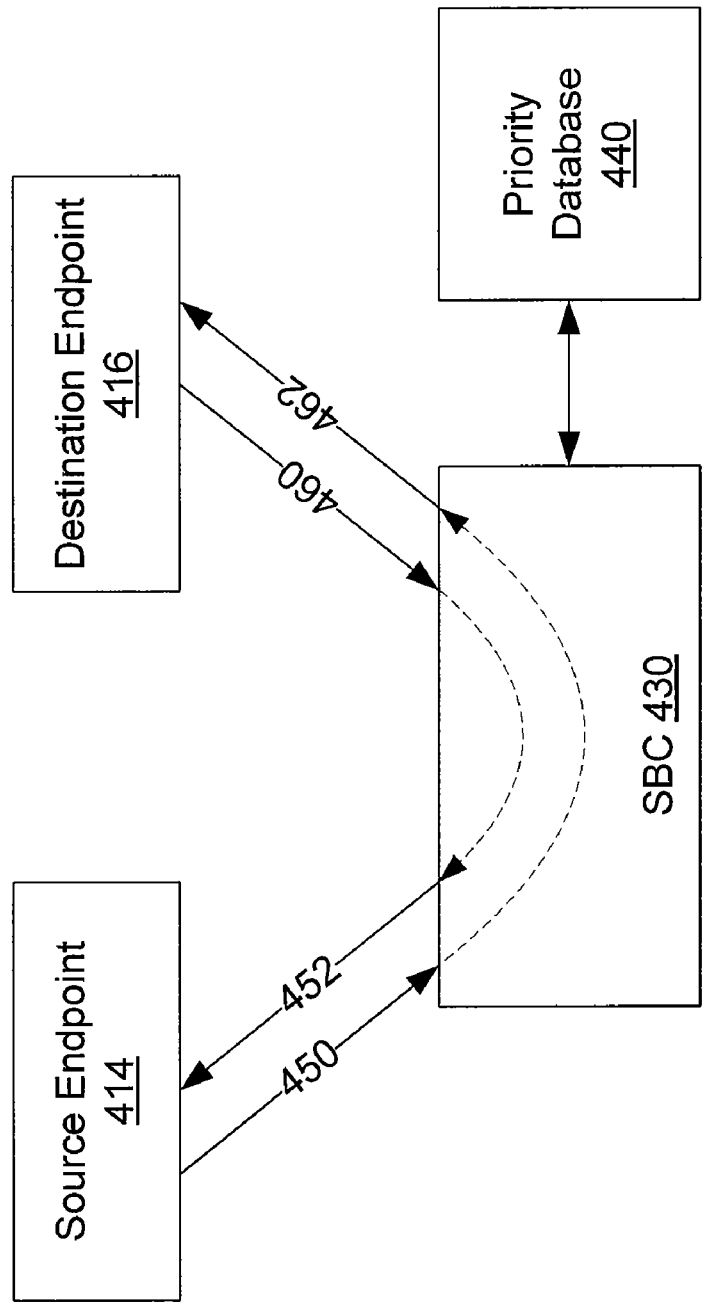
FIG. 4 is a system block diagram of an end-to-end call between a source endpoint and a destination endpoint via a session border controller (SBC), according to an embodiment of the invention.

FIG. 4 shows an example of a system block diagram of an end-to-end call between a source endpoint 414 and a destination endpoint 416 through an SBC 430. The end-to-end call between the source endpoint 414 and the destination endpoint 416 includes connections 450, 452, 460, and 462. The connections can be logical and/or physical connections. Connections 450 and 452 are associated with a first session and connections 460 and 462 are associated with a second session.

The source endpoint 414 is the endpoint that is initiating the end-to-end call through the SBC 430. When an IP packet is transmitted end-to-end from the source endpoint 414 to the destination endpoint 416, the packet is transmitted via connection 450 from the source endpoint 414 to the SBC 430 and is then forwarded by the SBC 430 via connection 462 from the SBC 430 to the destination endpoint 416. Likewise, for an end-to-end transmission of an IP packet from the destination endpoint 416 to the source endpoint 414, the IP packet is transmitted via connection 460 from the destination endpoint 416 to the SBC 430 and then forwarded by the SBC 430 in a transmission via connection 452 from the SBC 430 to the source endpoint 414.

The SBC 430 can receive session data associated with IP packets received via connections 450 and 460 and, using information stored in priority database 440, can modify the priority indicators associated with IP packets that are forwarded/sent via connections 452 and 462. The priority indicator associated with the IP packet, when received, can be a default priority indicator. Because SBC 430 is session-aware, SBC 430 can collect and/or calculate session data directly from the IP packets that are received at SBC 430. SBC 430 can have direct access to, for example, QoS parameter values contained in IP packets via connections 450 and 460 received by the SBC 430 or can calculate QoS parameter values for IP packets via connections 450 and 460 received by the SBC 430.

For example, the SBC 430 can receive session data, such as content type, associated with an individual IP packet received via connection 450 from source endpoint 414. Based on information in the priority database 440 that indicates a transmission priority value for the specific content type, the SBC 430 can modify the priority indicator associated with the IP packet before sending the IP packet via connection 462 to destination endpoint 416. The SBC 430 can send the IP packet based on the modified priority indicator. In some embodiments, the individual IP packet can be forwarded based on the priority indicator associated with the IP packet when the IP packet was received, even though the SBC 430 may have modified the priority indicator after the IP packet was received. In other words, the SBC 430 can modify the priority indicator of the IP packet so that it has a modified priority indicator without transmitting the IP packet based on the modified priority indicator.

The SBC 430 can calculate and/or store, using, for example, a mid-network collection technique, session data, for example, for a group of IP packets or an end-to-end call. The QoS parameter values from IP packets received via connections 450 and 460, although only portions of the end-to-end call, can be associated with a QoS for the end-to-end call. The QoS for the end-to-end call can be determined using any mathematical combination of IP packets transmitted via connections 450 and 460. For example, a QoS delay associated with an end-to-end call can be the sum of the average delay of a representative group of IP packets from connection 450 and the average delay of a representative group of IP packets from connection 460 for the end-to-end call. More details regarding calculations related to session data within a session controller are set forth in co-pending application Ser. No. 11/343,218, "Session Data Records (SDRs) and Related Alarming within a Session Over Internet Protocol (SoIP) Network," which is incorporated herein by reference.

In some embodiments, the SBC 430 can, for example, receive instructions from an SBC-network controller or from the priority database 440 to modify the priority indicators of a subsequently received IP packet or a subsequently received group of IP packets based on session data associated with a prior IP packet. For example, a first IP packet received at the SBC 430 can be an IP packet sent intentionally to trigger the changing of the priority indicators of a defined group of IP packets. The group of IP packets, in some embodiments, can be a subsequent group of IP packets. In this situation the priority indicator of the first IP packet can be, but does not necessarily have to be, changed in conformity with the priority indicators of the defined group of IP packets.

Also, for threshold conditions that are associated with, for example, a group of IP packets or an end-to-end call, the SBC 430 can collect session data for the group or the call from, for example, an SBC-network controller. The session data can be calculated by the SBC-network controller for retrieval by the SBC 430 and/or contained in one or more session-data records (SDRs), also referred to as a session-detail record, stored by the SBC-network controller. An SDR is typically received by the SBC-network controller 100 when the call is terminated, however, in some embodiments, SDRs or portions of SDRs can be received by the SBC-network controller 100 before a call has terminated as the portions of data become available. More details regarding SDRs within a session controller are set forth in the above-identified co-pending application entitled, "Session Data Records (SDRs) and Related Alarming within a Session Over Internet Protocol (SoIP) Network."

In some embodiments, rather than changing the priority indicator of an IP packet at the SBC 430, the SBC 430 can analyze the session data associated with a first IP packet and send an instruction to, for example, a transmitting device such as an endpoint (e.g., SBC, terminal adapter) so that the endpoint can change the priority indicator of one or more subsequent IP packets sent within that call. For example, an SBC 430 can receive session data that indicates that an IP packet contains video conferencing content that should be given a higher transmission priority value than other IP packets transmitted through the SBC 430. The SBC 430 can send an instruction to the source endpoint and the destination endpoint engaged in the video conferencing connection to increase the priority indicators for IP packets with the video conferencing content. In some embodiments, an SBC-network controller can use session data from an SDR to determine whether a priority indicator of an IP packet should be modified and can, for example, send an instruction to an SBC or endpoint so that the SBC or endpoint can modify the priority indicator.

The IP packets transmitted over connections 450, 452, 460, and 462 can be categorized as one of two types of IP packets—signaling packets or media-content packets (media-content packets also can be referred to as MoIP packets). Signaling packets and media-content packets can be referred to collectively as SoIP packets. The signaling packets are generally used to establish and terminate sessions (or calls) that are used for the exchange of media-content packets in, for example, a call. Layer-5 session-layer parameters and/or extrinsic parameters can be extracted directly from and/or calculated based on one or more signaling packets. Signaling packets can, however, be associated with any type of session data. For example, a layer-3 session-layer parameter calculated based on a media-content packet can also be associated with a signaling packet.

The media-content packets contain a media payload that can include, for example, data for a voice communication between source and destination endpoints during a call. Media-content packets can be associated with any type of session data (e.g., layer-5 session-layer parameters, layer-3 session-layer parameters, and/or extrinsic parameters). For example, a layer-5 session-layer parameter extracted from a signaling packet can also be associated with a media-content packet. Media-content packets include layer-3 session-layer parameters such as, for example, QoS parameters, a source address, and/or a destination address in, for example, a header (e.g., real-time transport protocol (RTP) header, user datagram protocol (UDP) header, IP header). Layer-3 session-layer parameters can be calculated and/or extracted from one or more media-content packets.

Figure 5:
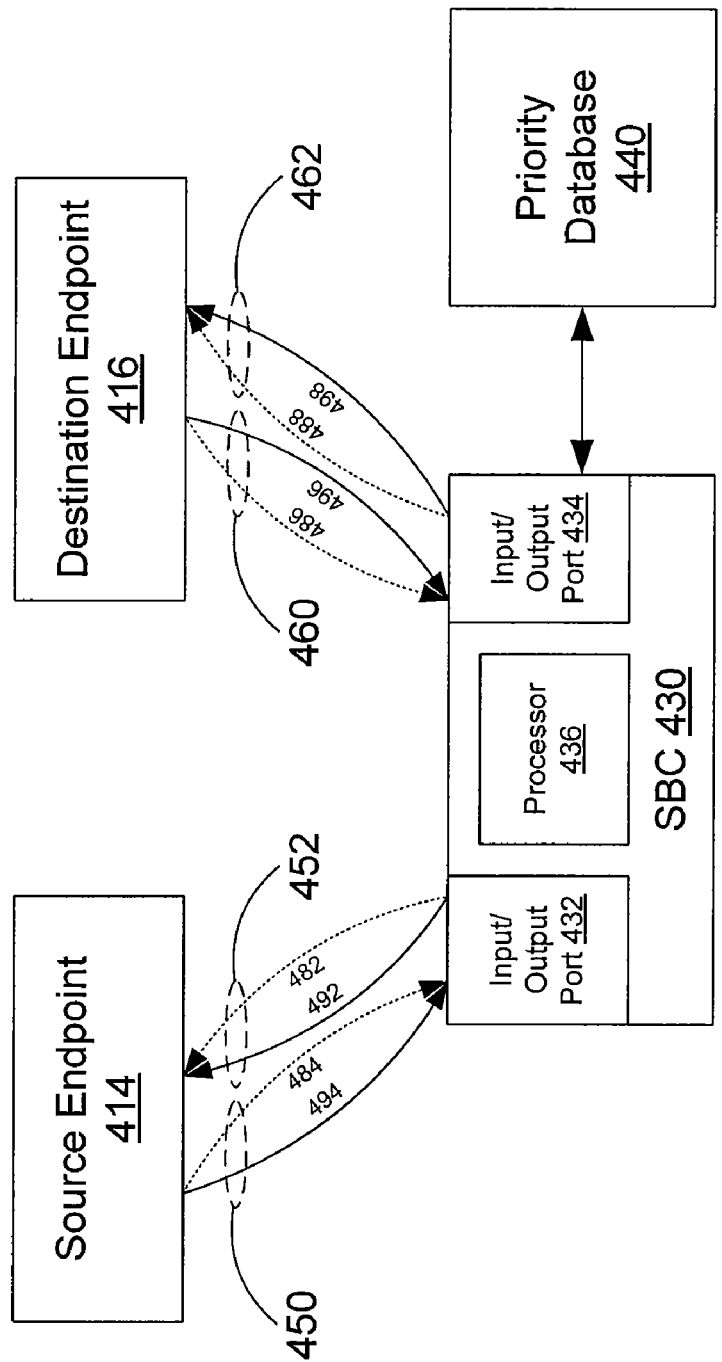
FIG. 5 is a schematic diagram that illustrates the IP packet transmissions shown in FIG. 4 categorized as signaling connections and media connections, according to an embodiment of the invention.

FIG. 5 is a schematic diagram that illustrates the IP packet transmitted via logical and/or physical connections 450, 452, 460, and 462 categorized as signaling connections 482-488 and media connections 492-498. The signaling connections 482-488 and/or the media connections 492-498 can be logical and/or physical connections. Signaling packets are transmitted via signaling connections 482-488, and media-content packets are transmitted via media connections 492-498.

Packet transmissions between the source endpoint 414 and the SBC 430 can be referred to as the ingress transmissions (i.e., ingress) and packet transmissions between the destination endpoint 416 and the SBC 430 can be referred to as the egress transmissions (i.e., egress). Data transmitted on signaling connections 484 and 488 can be referred to as an ingress SoIP request and an egress SoIP request, respectively, and data transmitted on signaling connections 482 and 486 can be referred to as an ingress SoIP response and an egress SoIP response, respectively.

Note that the signaling connections 482-488 and media connections 492-498 are shown separately to illustrate, for example, temporal differences in the transmission of media-content packets and signaling packets. The logical and/or physical connections used to transmit signaling packets and/or media-content packets on the ingress or egress legs can be shared.

Layer-5 session-layer parameters and/or extrinsic parameters extracted from the signaling packets transmitted over signaling connections 482-488 can be used to change priority indicators associated with one or more media-content packets transmitted over media connections 492-498. For example, layer-5 session-layer parameters and/or extrinsic parameters associated with signaling packets transmitted via ingress SoIP request 484 can be used to trigger a modification of a priority indicator of a media-content packet transmitted from SBC 430 via media connections 492 and/or 498. Likewise, layer-5 session-layer parameters and/or extrinsic parameters associated with one or more signaling packets transmitted via egress SoIP response 486 can be used to trigger a modification of a priority indicator of a media-content packet transmitted from SBC 430 via media connections 492 and/or 498.

In some embodiments, a combination of layer-5 session-layer parameters and/or extrinsic parameters received from signaling packets received at SBC 430 via signaling connections 484 and 486 can be used to trigger a modification of a priority indicator(s) associated with one or more media-content packets transmitted from SBC 430 via media connections 492 and/or 498. The modification of the priority of the media-content packet(s) can be triggered based on data in the priority database 440 such as whether or not the combination as defined in a threshold condition is satisfied.

QoS parameter values (e.g., layer-3 QoS parameter values) calculated based on and/or retrieved from one or more media-content packets can also be used to determine whether or not a priority indicator should be modified for, for example, a single media-content packet or group of media-content packets. The QoS parameter can be associated with a portion of the transmissions between the source endpoint 414, destination endpoint 416, and/or SBC 430.

In some embodiments, a QoS parameter value associated with a media-content packet can be used to trigger a modification of a priority indicator of the same media-content packet. For example, a QoS parameter value associated with a media-content packet received at the SBC 430 via media connection 494 can be used to modify a priority indicator associated with the media-content packet when transmitted from the SBC 430 via media connection 498. In some embodiments, a QoS parameter(s) associated with a media-content packet(s) can be used to modify a priority indicator associated with a signaling packet(s).

In some embodiments, a QoS parameter value associated with a media-content packet can be used to trigger a modification of a priority indicator of a subsequent media-content packet. For example, a QoS parameter value associated with a media-content packet received at the SBC 430 via media connection 494 can be used to modify a priority indicator associated with a subsequent media-content packet transmitted from the SBC 430 via media connection 498 and/or via media connection 492.

In some embodiments, a modification can be based on a combination of, for example, QoS parameter values that can be, for example, calculated from several media-content packets. For example, a QoS parameter value can be calculated based on a combination of, for example, a QoS parameter value retrieved from a first media-content packet and a QoS parameter value calculated based on a second media-content packet. The combined QoS parameter value can be used to trigger a modification of a priority indicator in an IP packet. In some embodiments, QoS parameters associated with one or more media-content packets can be used with, for example, any type of session data (e.g., extrinsic parameters and/or layer-5 session-layer parameters) included in or associated with signaling packets to trigger a modification of a priority indicator in media-content and/or signaling packets.

As shown in FIG. 5, SBC 430 includes an input/output port 432, an input/output port 434, and a processor 436. Input/output port 432 is configured to transmit and receive IP packets, session data, and/or instructions to and from source endpoint 414, respectively. Input/output port 434 is configured to transmit and receive IP packets, session data, and/or instructions to and from destination endpoint 416, respectively. Input/output port 434 is also configured to receive threshold conditions from the priority database 440. The input/output ports 432 and/or 434 can also be configured to receive instructions and/or session data from a network controller (not shown).

The processor 436 is configured to process threshold conditions received from the priority database 440, extract session data from IP packets (e.g., QoS parameters), process session data with reference to the threshold conditions, and modify the priority indicators of IP packets when triggered by a threshold condition. The functions associated with the processor 436 can be modified via a user interface (not shown) or modified via a network controller (not shown).

Although this embodiment shows two separate input/output ports 432 and 434, the input/output ports 432 and 434 can, in some embodiments, be integrated into a single input/output port or separated into multiple different input and/or output ports. Likewise, the processor 436 can be divided into separate hardware and/or software modules that perform the functions associated with the processor 436.

Figure 6:
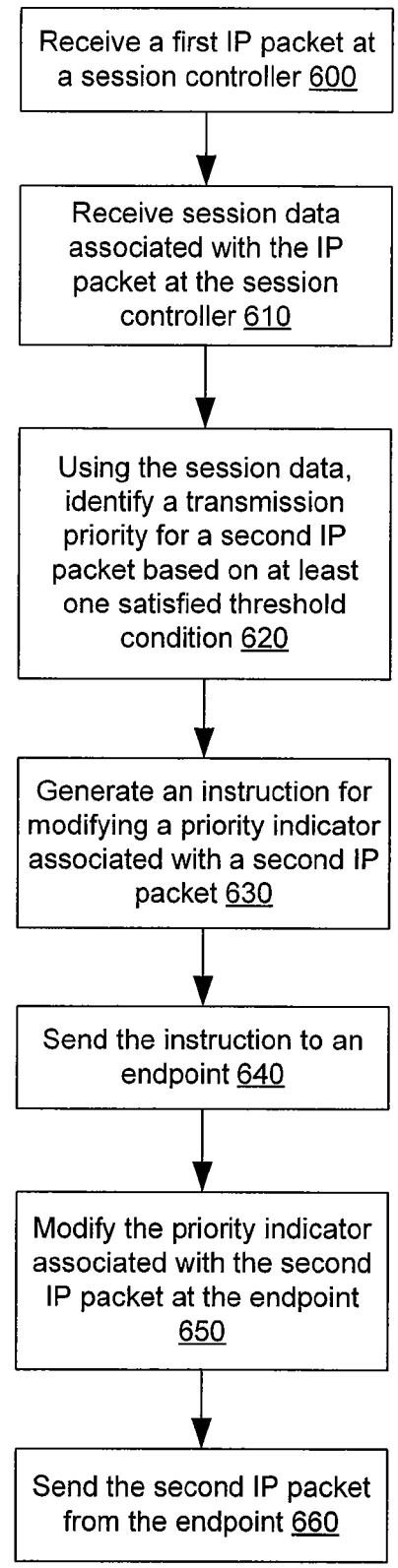
FIG. 6 is an example of a flowchart that can be implemented to cause a priority indicator to be changed at an endpoint, according to an embodiment of the invention.

FIG. 6 is an example of a flowchart that can be implemented by a session controller to cause a priority indicator to be changed at an endpoint rather than at the session controller (also referred to herein as multistage prioritization). Although this flowchart makes reference to an endpoint and to a session controller, the flowchart can be implemented by any type of session-aware equipment or component, and the endpoint can be any kind of endpoint or device such as a second session controller or even a terminal adapter.

As the flowchart of FIG. 6 shows, a first IP packet is received at a session controller at 600 and the session data associated with that IP packet is received at 610. Using the session data, a transmission priority value for a second IP packet is identified by the session controller based on one or more satisfied threshold conditions at 620. For example, the priority database can contain information that indicates that when a threshold condition is satisfied for a first IP packet, that the transmission priority value associated with a second IP packet should be modified rather than the transmission priority value associated with the first IP packet.

When the session controller determines that the transmission priority value for the second IP packet should be changed, the session controller generates an instruction (also referred to as a priority-modification instruction) for modifying the priority indicator associated with the second IP packet at 630. In this embodiment, the instruction is configured so that the modification of the priority indicator associated with the second IP packet can be executed at an endpoint and not at the session controller. After the instruction is configured, the instruction is sent to the endpoint at 640 and the endpoint modifies the priority indicator associated with the second IP packet at 650. The second IP packet with the modified priority indicator can then be sent from the endpoint at 660.

In some embodiments, the instruction can be sent from a first session-aware component to a second session-aware component. Also, rather than modifying the priority indicator with an individual second IP packet, the instruction can be used to instruct a second device to modify the priority indicators of multiple subsequent IP packets and to send the multiple subsequent IP packets based on the modified priority indicators in accordance with the modified transmission priority values.

Figure 7:
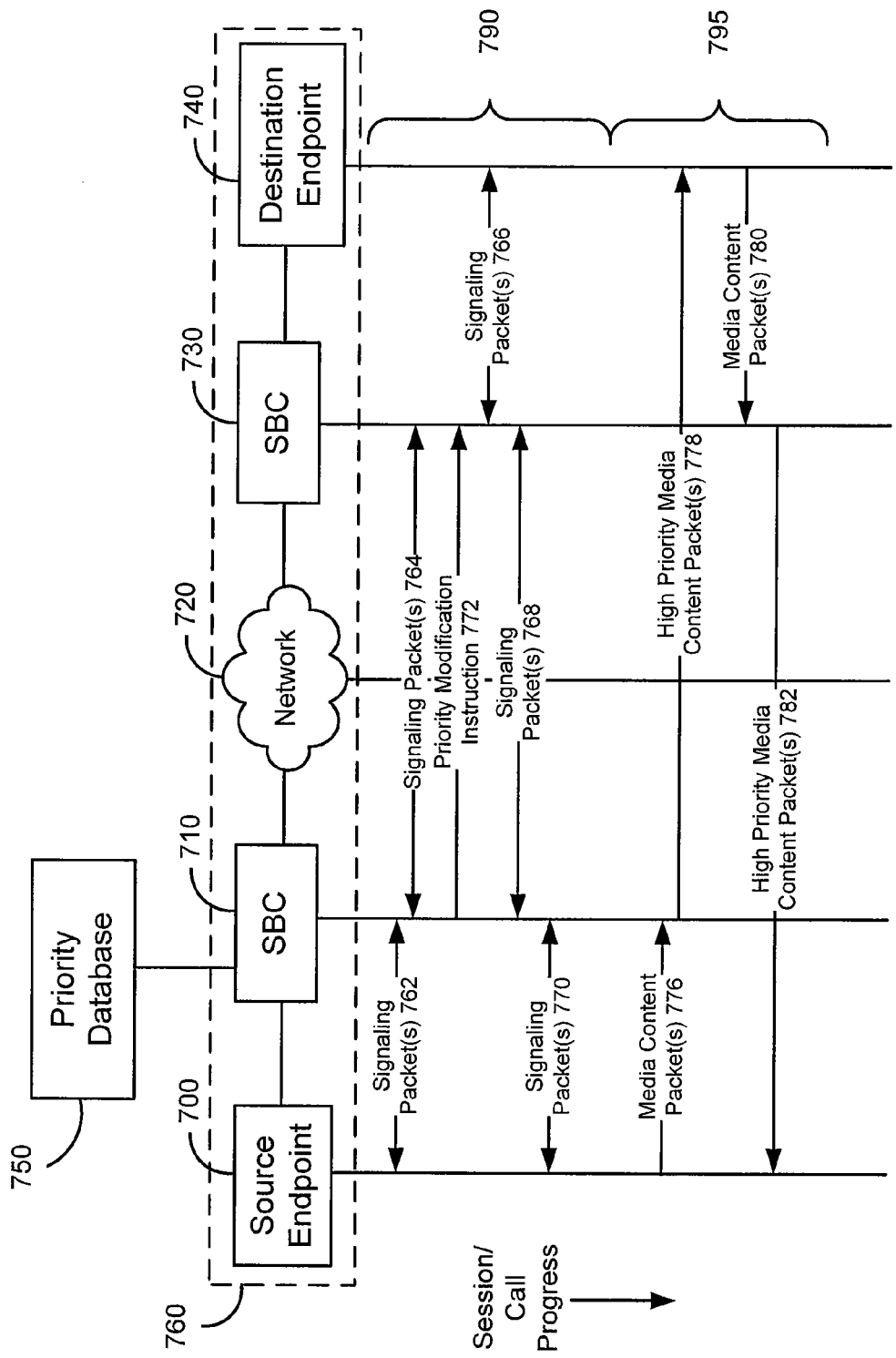
FIG. 7 is schematic diagram that illustrates an implementation of multistage prioritization, according to an embodiment of the invention.

FIG. 7 is schematic diagram that illustrates an implementation of the flowchart shown in FIG. 6. Specifically, FIG. 7 illustrates an example of multistage prioritization where SBC 710 (associated with the first stage) determines a priority indicator of a first IP packet over a call and sends a priority-modification instruction 772 to SBC 730 (associated with the second stage) to trigger SBC 730 to modify a priority indicator of a second IP packet. SBC 710 has access to priority database 750 and is configured to determine, using the priority database 750 and session data (e.g., session layer parameters and/or extrinsic parameters), whether a priority indicator associated with a media-content packet should be modified. SBC 730, however, does not have access to the priority database 750 and/or is not configured to make prioritization determinations until it receives the priority-modification instruction 772. SBC 730 can use the priority-modification instruction 772 and session data received at SBC 730 to modify the priority indicators associated with one or more IP packets.

FIG. 7 shows a source endpoint 700 (associated with the first stage) engaging in a call (e.g., end-to-end call) with a destination endpoint 740 (associated with the second stage) via SBC 710, network 720 and SBC 730. The source endpoint 700 is an endpoint that has been designated as a high-priority endpoint, for example, because the endpoint is located in an office of a chief operating officer.

The priority database 750, in this example embodiments, has been specifically configured with a threshold condition, based on the status of the source endpoint 700 as a high-priority endpoint, to trigger the modification of one or more media-content packets originating from source endpoint 700 to have a high transmission-priority value. The status of the source endpoint 700 is included in session data associated with one or more signaling packets that are received at SBC 710. Because destination endpoint 740 is an endpoint that has been designated as a normal priority endpoint, media-content packets originating at destination endpoint 740 and being sent to source endpoint 700 during the call would be transmitted at a normal priority if not modified due to the high-priority status of endpoint 700.

As shown in FIG. 7, the vertical axis illustrates the session/call progress in a downward direction. The source endpoint 700, SBC 710, network 720, SBC 730, and destination endpoint 740 can collectively be referred to as components 760 (the network 720 is a network of components such as switches and routers). Signaling packets 762-770 are transmitted between the respective components 760 to establish sessions between the components 760 during the time period 790. Media-content packets 776-782 are exchanged between the source endpoint 700 and the destination endpoint 740 during time period 795 and after time period 790.

The transmissions of IP packets (signaling packets and media-content packets) 762-782 between the components 760 are representative of the transmissions between components 760 and are not intended to portray required transmissions and/or the required order of transmissions. For example, transmission of signaling packet(s) 768 between SBC 730 and destination endpoint 740 can be representative of one or more requests and/or response signaling packets being sent, received, and/or used in establishing, for example, a session between SBC 730 and destination endpoint 740. The IP packets 762-782 are transmitted over physical and/or logical connections.

In this embodiment, SBC 710 receives signaling packet(s) 762 and can determine that priority indicators associated with media-content packet(s) 776 transmitted from source endpoint 700 should be modified so that the media-content packet(s) 776 have priority indicators that indicate a high transmission-priority value. SBC 710 makes this determination, in this embodiment, based on the status of the source endpoint 700 as a high-priority endpoint as indicated by session data associated within the signaling packet(s) 762 and with reference to the priority database 750. Consequently, the priority indicators associated with media-content packet(s) 776 are modified at SBC 710 to have a priority indicator that indicates a high transmission priority. The media-content packet(s) 776 with modified priority indicators are then transmitted to destination endpoint 740 via network 720 and SBC 730 as high-priority media-content packet(s) 778.

Also, in this embodiment, SBC 710 is configured to send a priority-modification instruction 772 to SBC 730 (e.g., second session controller) to trigger SBC 730 to modify media-content packet(s) 780 originating at destination endpoint 740 and addressed to source endpoint 700 to have a high transmission-priority value. Because destination endpoint 740 is not a high-priority endpoint, media-content packet(s) 780 received at SBC 730 from destination endpoint 740 would not typically be modified (i.e., transmitted with a high priority) at SBC 730 without being triggered by priority-modification instruction 772. The media-content packet(s) 780 that have been modified can then be transmitted to source endpoint 700 via network 720 and SBC 710 as high-priority media-content packet(s) 782.

The multistage prioritization technique triggered using the priority-modification instruction 772 enables one or more media-content packets transmitted in both directions over the end-to-end call (from the destination endpoint 740 to the source endpoint 700, and from the source endpoint 700 to the destination endpoint 740) to have a high-priority rather than just media-content packet(s) 776 originating at the high-priority source endpoint 700. In some embodiments, the priority indicators associated with one or more signaling packets can be modified in addition to, or instead of, one or more media-content packets.

The specific parameters defined in priority-modification instruction 772 can be based on threshold conditions, rules, and/or instructions included in the priority database 750. Priority-modification instruction 772 can be configured to override other prioritization related instructions that may have been received or generated at SBC 730.

Also, in some embodiments, a priority-modification instruction can be configured to trigger the modification of a priority in various, specific ways based on, for example, rules and/or threshold conditions that are included in the priority-modification instruction. For example, based on a first set of threshold conditions, rules and/or instructions, a first SBC can generate a priority-modification instruction(s) that is sent to a second SBC(s). The priority-modification instruction(s) can include a second set of threshold conditions, rules and/or instructions that are used at the second SBC(s) to trigger the modification of priority indicators of certain types of packets originating and addressed to more than one destination and routed on a particular route.

In some embodiments, SBC 710 can be configured to send an instruction such as priority-modification instruction 772 to any SBC that can be configured to retransmit media-content packets that originate at destination endpoint 740 and are addressed to source endpoint 700. For example, SBC 710 can be configured to, for example, broadcast a priority-modification instruction to several SBCs that can potentially route media-content packets originating at destination endpoint 740 and addressed to source endpoint 700. In some embodiments, the priority-modification instruction can persist (e.g., be used) during only the duration of the particular call between source endpoint 700 and destination endpoint 740. In some embodiments, however, the priority-modification instruction can be configured to persist for a longer period of time at, for example, SBC 730.

In this embodiment, the high-priority endpoint was the source endpoint 700, in some embodiments, the high-priority endpoint can be the destination endpoint 740. Aside from the fact that the high-priority endpoint is not initiating the call, the multistage prioritization can be executed in substantially the same fashion. Once a first stage (e.g., first SBC) has determined that media-content packets should be modified to have a high-priority using a priority database, the first stage can transmit a priority-modification instruction for a second stage (e.g., second SBC). The first stage can be associated with a destination endpoint and the second stage can be associated with a source endpoint.

In some embodiments, the priority-modification instruction can be generated for a second stage to trigger modification of, for example, media-content packets that are sent from the second stage to a third device associated with a third stage (e.g., cascading stages). In this scenario, the priority-modification instruction would be received by the second stage over a first session and the media-content packet would be sent over a second session to the third stage.

Although the embodiment described in FIG. 7 focuses on the status of the source endpoint 700 as a parameter value that triggers multistage prioritization, in many embodiments, multistage prioritization is triggered by any combination of session data that can be associated with signaling packets and/or media-content packets. For example, QoS parameter values calculated and/or retrieved from media-content packets at a first stage (e.g., first SBC) can also be used to trigger and define a priority-modification instruction that triggers a modification of a priority indicator at a second stage (e.g., second SBC).

Figure 8:
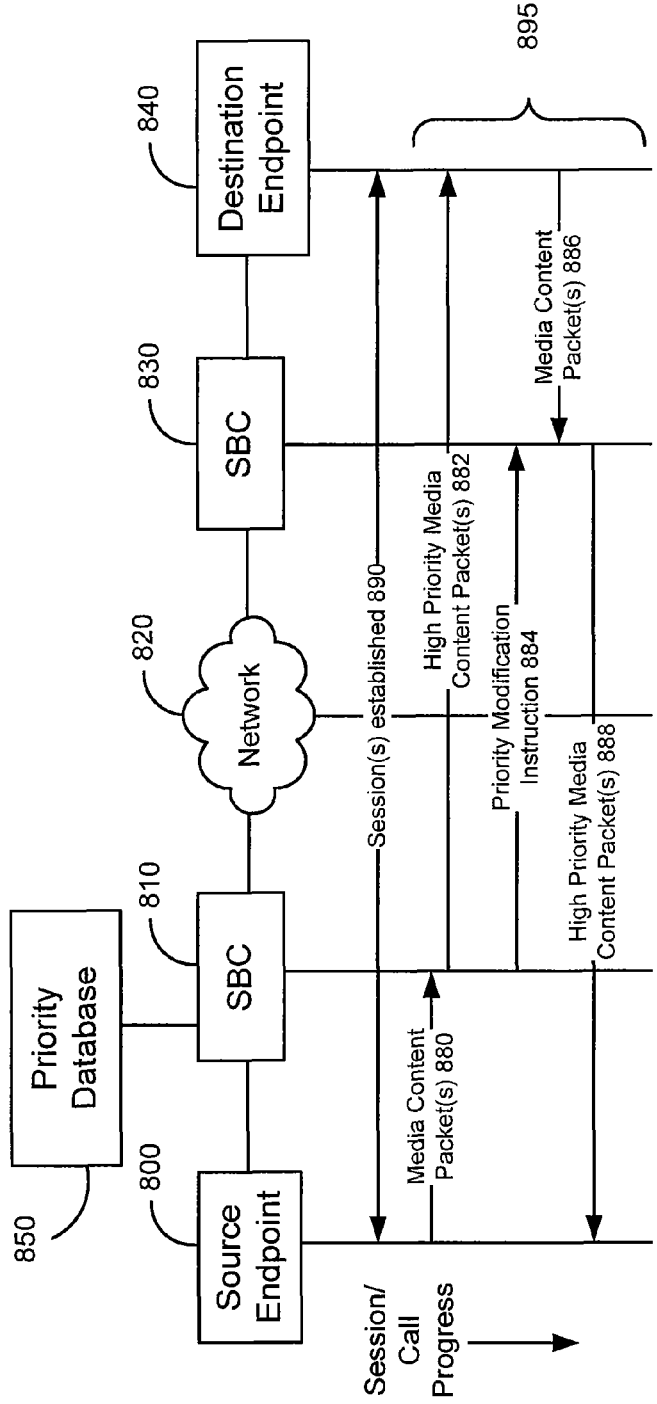
FIG. 8 is schematic diagram that illustrates an implementation of multistage prioritization, according to an embodiment of the invention.

FIG. 8 is schematic diagram that illustrates an implementation of multistage prioritization that is triggered by QoS parameters associated with media-content packets after a session(s) has been established 890. FIG. 8 shows a source endpoint 800 engaging in a call with a destination endpoint 840 via SBC 810, network 820 and SBC 830. Priority database 850 has been configured with a threshold condition defined based on QoS parameter values. The threshold condition is configured to trigger the modification of media-content packet(s) 880 received at SBC 810 when the threshold condition is satisfied. The threshold condition can be defined so that the priority indicators of the media-content packets can be changed to a specified priority when a specified QoS parameter value(s) is, for example, calculated or retrieved. The threshold condition is also defined to trigger the sending of a priority-modification instruction 884 to SBC 830 to cause SBC 830 to change the priority of media-content packet(s) 886 received at SBC 830.

In some embodiments, the priority indicator associated with an IP packet can be changed based on, for example, a mathematical equation. For example, a high jitter value can trigger SBC 830 to change the priority indicator to a higher value than if the jitter value were low. In some embodiments, the priority-modification instruction 884 can be based on session data associated with signaling packets (not shown) as well as the QoS parameters associated with media-content packet(s) 880.

Figure 9:
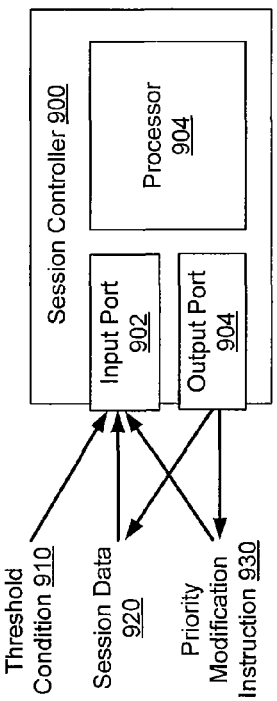
FIG. 9 illustrates a schematic diagram of a session controller configured to process a priority-modification instruction, according to an embodiment of the invention.

FIG. 9 illustrates a schematic diagram of a session controller 900 configured to process a priority-modification instruction 930, according to an embodiment of the invention. The session controller 900 includes a processor 904, an input port 902, and an output port 904. The session controller 900 is configured to send priority-modification instruction 930 and/or session data 920 via the output port 904 to an entity (e.g., stage, SBC) within a SoIP network (not shown). The session controller 900 is also configured to receive a threshold condition 910, session data 920 and/or one or more priority-modification instructions 930 (e.g., a priority-modification instruction from a separate SBC) via the input port 902. The threshold condition 910 can be received from a priority database (not shown). In some embodiments, the input port 902 and output port 904 are integrated into a single port (not shown).

The session controller 900 is configured to define the priority-modification instruction 930 based on session data 920 received at the processor 904 via input port 902 and the threshold condition 910 received at the processor 904 via input port 902. The processor 904 within the session controller 900 is also configured to modify a priority indicator associated with an IP packet that is associated with a call (e.g., signaling packet and/or media-content packet) in response to a priority-modification instruction 930.

Figure 10:
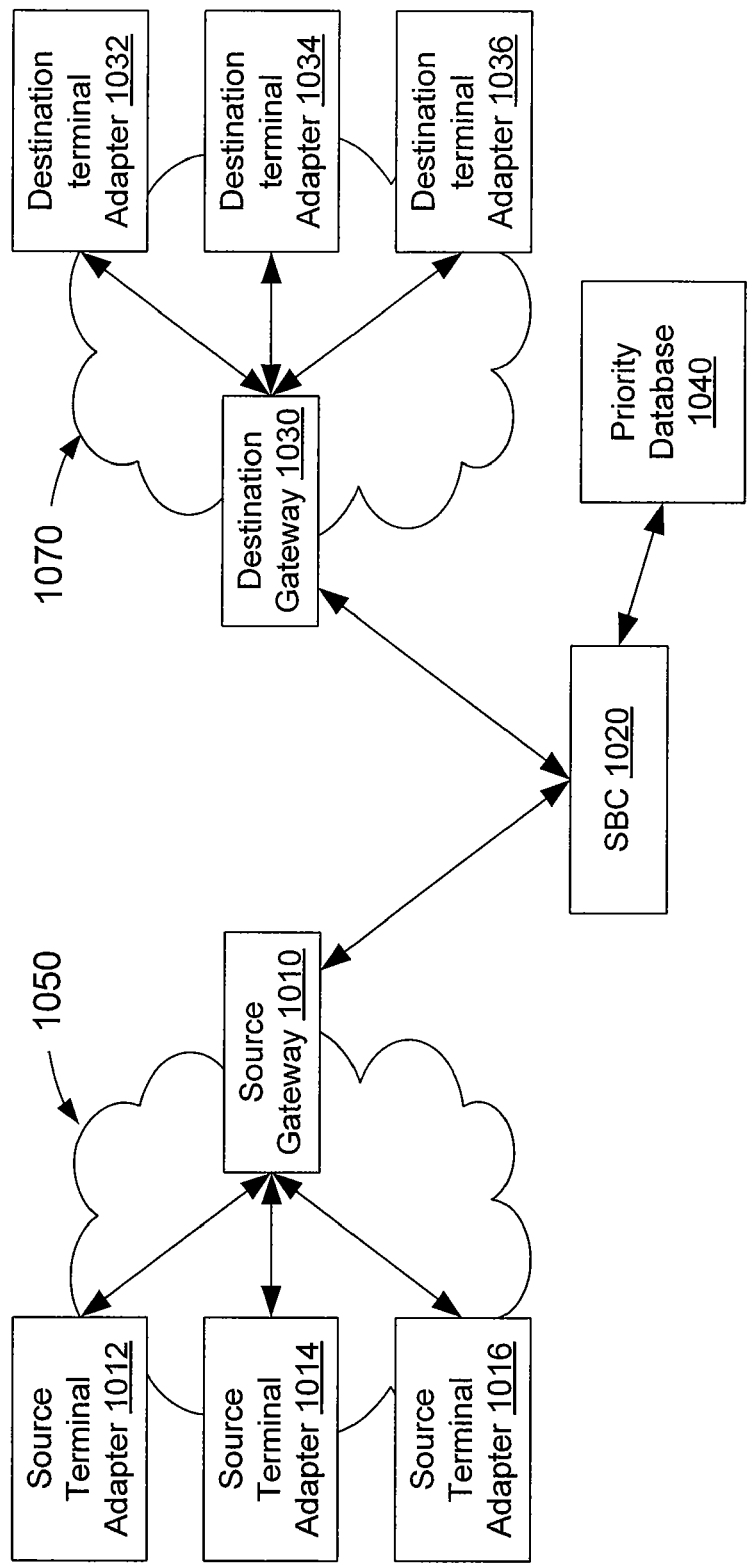
FIG. 10 is a system block diagram that shows an SBC transmitting IP packets between a source gateway and a destination gateway, according to an embodiment of the invention.

FIG. 10 is an example of a system block diagram that shows an SBC 1020 transmitting IP packets between a source gateway 1010 and a destination gateway 1030. The gateways 1010 and 1030 are access points into networks 1050 and 1070, respectively. In this embodiment, the SBC 1020 analyzes session data (e.g., session layer parameter values and/or extrinsic layer parameter values) associated with the source terminal adapters 1012, 1014, and 1016 and the destination terminal adapters 1032, 1034, and 1036 to determine whether the transmission priority values associated with IP packets transmitted by any of the terminal adapters should be modified. The session data can be, for example, contained in the IP packets associated with any one of the terminal adapters. The SBC 1020 uses the session data with reference to threshold conditions that are defined in the priority database 1040 to determine whether or not to make a transmission priority change (e.g., change a transmission indicator in an IP packet based on a transmission priority value).

The SBC 1020 can determine, based on the session data, that IP packets from a particular terminal adapter should be assigned, for example, a higher priority. For example, the source terminal adapter 1012, as defined by a threshold condition contained in the priority database 1040, can indicate that any transmission from source terminal adapter 1012 is to be assigned a higher transmission priority value than IP packets transmitted by other terminal adapters. The IP packets from the source terminal adapter 1012 can be assigned high transmission priority values based on, for example, a threshold condition that includes a description of source terminal adapter 1012. Based on this information, the SBC 1020 can modify the priority indicators associated with IP packets transmitted by source terminal adapter 1012 to have priorities higher than the priorities associated with IP packets transmitted from the other terminal adapters.

In some embodiments, the SBC 1020 can send an instruction, based on information in the priority database, to the source gateway 1010 to change the transmission priority values before they reach the SBC 1020. In another embodiment, the SBC 1020 can also send an instruction to the source terminal adapter 1012 to generate IP packets with a certain transmission priority value. In yet another embodiment, the SBC 1020 can determine, based on information contained in the priority database 1040, that IP packets transmitted to destination terminal adapter 1034 should be assigned a higher priority than other IP packets transmitted through SBC 1020.

Figure 11:
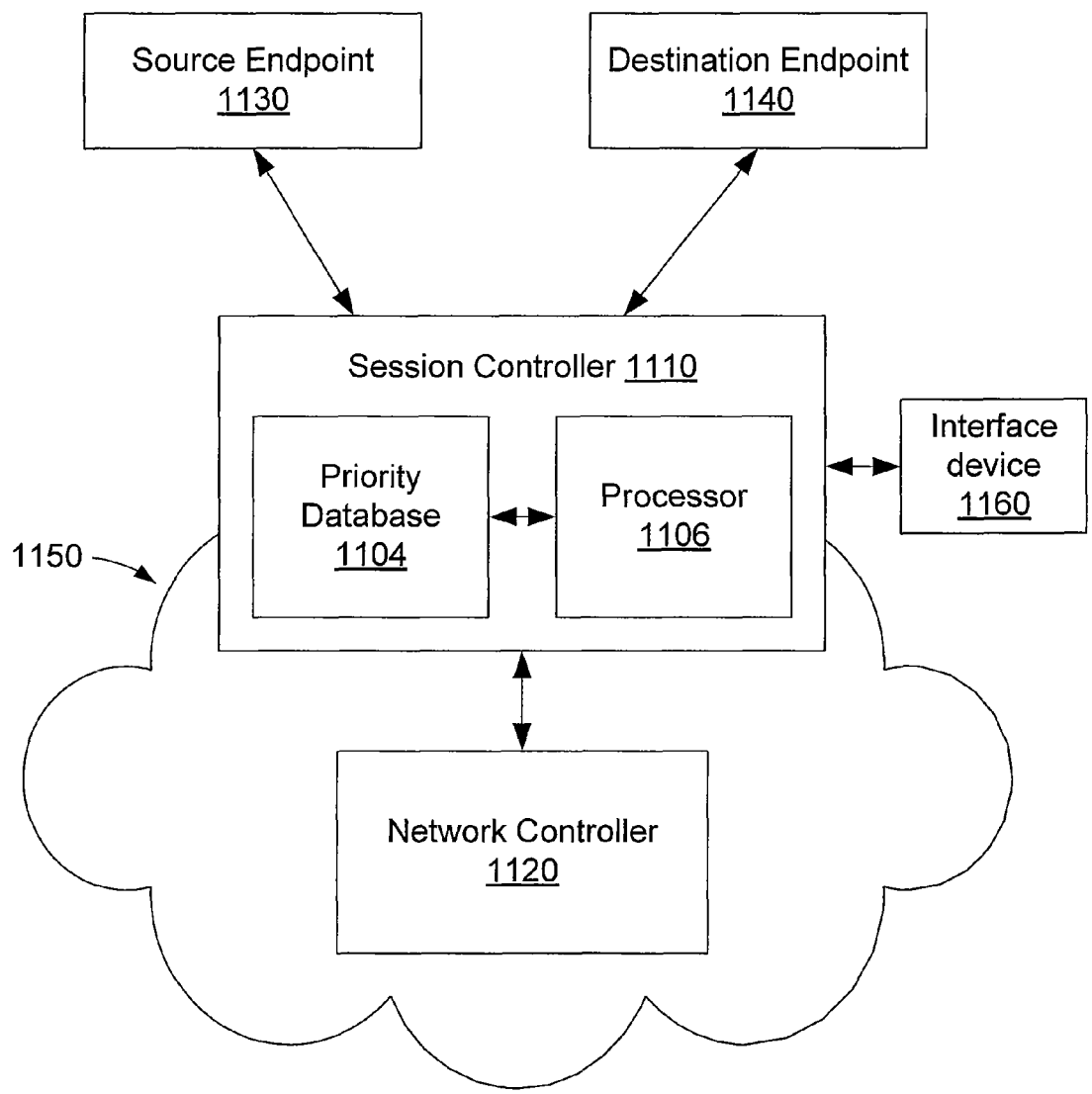
FIG. 11 is a system block diagram that illustrates a session controller that is designed for changing a priority indicator associated with an IP packet transmitted over a SoIP network, according to an embodiment of the invention.

FIG. 11 is an example of a system block diagram that illustrates a session controller 1110 configured to change a priority indicator associated with an IP packet transmitted over a SoIP network 1150 between a source endpoint 1130 and a destination endpoint 1140. The SBC 1110 is also coupled to a network controller 1120. The SBC 1110 includes a priority database 1104 and a processor 1106. The priority database 1104 associates a transmission priority value with at least one threshold value that is based on any combination of a session layer parameter and/or an extrinsic parameter. The processor 1106 accesses the priority database 1104 to associate the transmission priority value with the IP packet based on session data.

The processor 1106 of the session controller 1110 is configured to produce and/or send instructions to, for example, the source endpoint 1130 or the destination endpoint 1140. The session controller 1110 can also include, for example, an interface/input device 1160 for configuring and updating the priority database 1104 and for programming or modifying the processor 1106. The interface can be a user interface or can be an interface that is accessed via the network controller 1120.

In conclusion, among other things, a method for modifying the priority of SoIP IP packets based on any combination of session layer parameters and/or extrinsic parameters is described. While various embodiments of the invention have been described above, it should be understood that they have been presented by way of example only, and various changes in form and details may be made. For example, a priority database can be a distributed database shared by multiple session controllers.

What is claimed is:

1. A method, comprising:
receiving, at a first endpoint, session data associated with a first Internet Protocol (IP) packet, the first IP packet being associated with a session within a Session over Internet Protocol (SoIP) network, the session being associated with a call;
identifying, in a priority database accessed by the first endpoint, a transmission priority value associated with the first IP packet; and
sending an instruction from the first endpoint to a second endpoint, the instruction being based on the session data, the instruction being configured to trigger the second endpoint to modify, based on the transmission priority value, a priority indicator associated with a second IP packet associated with the call, wherein the first endpoint and the second endpoint are each configured to transmit signaling packets and media-content packets, wherein the second endpoint does not have access to the priority database and is not configured to modify the priority indicator associated with the second IP packet until the instruction is received.

2. The method of claim 1, wherein the first IP packet is at least one of a signaling packet or a media-content packet, the signaling packet includes protocol language used to establish the session.

3. The method of claim 1, wherein the second IP packet is at least one of a signaling packet or a media-content packet, the signaling packet includes protocol language used to establish the session.

4. The method of claim 1, wherein the instruction is a priority-modification instruction.

5. The method of claim 1, further comprising receiving, at the first endpoint, session data associated with a third IP packet, the instruction being based on the session data associated with the third IP packet.

6. The method of claim 1, further comprising receiving the second IP packet from the second endpoint via a connection associated with the session.

7. The method of claim 1, wherein the session is a first session, the second endpoint transmits the at least one of the first IP packet or the second IP packet via a connection associated with a second session.

8. The method of claim 1, wherein the session data is at least one of a layer-3 session-layer parameter, a layer-5 session-layer parameter, or an extrinsic parameter.

9. The method of claim 1, wherein the first endpoint is a session controller, the session data is associated with at least one of a source endpoint or a destination endpoint.

10. The method of claim 1, wherein the second endpoint is at least one of a session controller, a source endpoint, or a destination endpoint.

11. The method of claim 1, wherein the session data indicates a status of at least one of a source endpoint or a destination endpoint.

12. The method of claim 1, wherein the instruction includes a threshold condition, the second endpoint modifies the priority indicator in response to the threshold condition being satisfied.

13. A method, comprising:
receiving, at a first endpoint, a priority-modification instruction defined at a second endpoint, wherein the priority-modification instruction is defined based on session data associated with a first Internet Protocol (IP) packet of a call in a Session over Internet Protocol (SoIP) network, wherein the second endpoint is configured to access a priority database to identify a transmission priority value associated with the first IP packet; and
in response to receiving the priority-modification instruction, modifying, based on the transmission priority value, a priority indicator associated with a second IP packet associated with the call at the first endpoint, the second IP packet being transmitted over the SoIP network based on the priority indicator, wherein the first endpoint and the second endpoint are each configured to transmit signaling packets and media-content packets, and wherein the first endpoint does not have access to the priority database and is not configured to modify the priority indicator associated with the second IP packet until the priority-modification instruction is received.

14. The method of claim 13, wherein the priority-modification instruction includes a threshold condition, the modifying being based on the threshold condition.

15. The method of claim 13, further comprising receiving session data associated with the IP packet, the modifying being based on the session data.

16. The method of claim 13, wherein the IP packet is a first IP packet, the priority-modification instruction is based on session data associated with a second IP packet.

17. The method of claim 13, wherein the IP packet is at least one of a media-content packet or a signaling packet.

18. The method of claim 13, wherein the second endpoint is a session controller.

19. The method of claim 13, wherein the first endpoint is at least one of a session controller, a source endpoint, or a destination endpoint.

20. The method of claim 13, wherein the priority-modification instruction is based on session data, the session data is associated with at least one of a source endpoint or a destination endpoint.

21. The method of claim 13, wherein the priority-modification instruction is defined based on session data, the session data includes a value of at least one of a session layer parameter or an extrinsic parameter.

22. An apparatus, comprising:
a processor configured to receive session data associated with a first Internet Protocol (IP) packet, the first IP packet being associated with a session within a Session over Internet Protocol (SoIP) network, the processor being configured to define a priority-modification instruction based on the session data, the session being associated with a call, wherein the processor is configured to access a priority database to identify a transmission priority value associated with the first IP packet; and
an output port configured to send the priority-modification instruction to an endpoint, wherein the priority-modification instruction triggers the endpoint to modify, based on the transmission priority value, a priority indicator of a second IP packet associated with the call, and wherein the output port is configured to send both signaling packets and media-content packets, wherein the endpoint does not have access to the priority database and is not configured to modify the priority indicator of the second IP packet until the priority-modification instruction is received.

23. The apparatus of claim 22, wherein the IP packet is at least one of a media-content packet or a signaling packet.

24. The apparatus of claim 22, wherein the session data includes at least one of a value of a layer-3 session-layer parameter, a layer-5 session-layer parameter, or an extrinsic parameter.

25. The apparatus of claim 22, wherein the endpoint is at least one of a session controller, a source endpoint, or a destination endpoint.

26. The apparatus of claim 22, wherein the endpoint is configured to modify a priority indicator associated with at least one of a media-content packet or a signaling packet in response to the priority-modification instruction.

* * * * *